United States Patent [19]

Landecker

[11] 3,884,726

[45] May 20, 1975

[54] THERMOELECTRIC ELEMENT

[76] Inventor: Kurt Landecker, 157 Marsh St., Armidale, New South Wales, Australia

[22] Filed: Apr. 19, 1973

[21] Appl. No.: 352,843

[30] Foreign Application Priority Data

May 11, 1972 Australia ............................ 8924/72

[52] U.S. Cl. ................ 136/203; 136/205; 136/212; 136/224; 62/3

[51] Int. Cl. ................................................ H01v 1/02

[58] Field of Search ........... 136/200, 201, 203, 205, 136/211, 212, 222, 223, 224, 225; 62/3

[56] References Cited

UNITED STATES PATENTS

| | | | |
|---|---|---|---|
| 3,074,242 | 1/1963 | Lindenblad | 136/205 UX |
| 3,632,541 | 1/1972 | Abbott | 136/203 |

*Primary Examiner*—Verlin R. Pendegrass
*Attorney, Agent, or Firm*—Browne, Beveridge, DeGrandi & Kline

[57] ABSTRACT

Thermoelectric elements are disclosed comprising N conductor and a P conductor, connected together at a working junction and adapted to be connected to an external current source, or an electrical lead.

17 Claims, 13 Drawing Figures

THERMOELECTRIC ELEMENT

Figure 1:
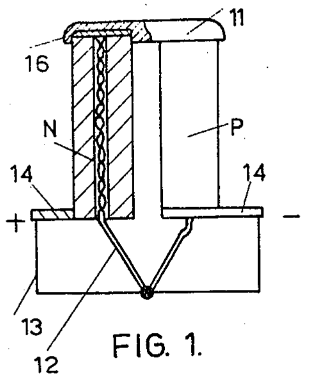

This invention relates to thermoelectric elements of the kind comprising two dissimilar conductors, semiconductors or intermetallic compounds, referred to respectively as the N and P conductors hereinafter, connected together usually by way of an intervening conductor, to form a working junction.

If an electric current is passed through the N and P conductors so as to flow from one to the other through the working junction, the junction adopts a temperature differing from that of the portions of the N and P conductors remote from it. The working junction temperature rises or falls depending upon the direction of current flow.

Alternatively, if the working junction is heated or cooled relative to the remote parts of the N and P conductors, a potential difference is established across the element so that when the conductors are connected in a suitable circuit a current flow is established. The direction of the current flow depends upon whether the working junction is heated or cooled.

Such thermoelectric elements are well-known and are commonly used on the one hand to heat or cool an external medium or to transfer heat from one medium to another and on the other hand to produce electricity.

In as much as there must be a complete circuit for current flow there must always be at least one further or non-working junction when a thermoelectric element is put to use. Usually the non-working junction includes within it either the means for maintaininig current flow or the electrical load supplied by the element.

In practice, the non-working junction is exposed to surroundings remote or isolated from those to which the working junction is exposed and each junction may be conditioned so as to readily dissipate heat to or absorb heat from its surroundings.

It will be clear from the foregoing that thermoelectric elements may be operated in one of two modes. Furthermore, elements which are efficient when operating in one mode are correspondingly efficient when operating in the other. Therefore, for descriptive convenience the further description of the invention does not distinguish between the two modes of operation or types of element.

In a common form of thermoelectric element the N & P conductors are in the form of cylindrical or prismatic rods of uniform cross-section and similar dimensions connected together at the working junction by a rigid bridging conductor to which an end of each of the N & P conductors is soldered and connected together at their other ends by means of an external circuit including a uni-directional current source. The two N & P conductors are disposed side by side and are parallel each to each.

More particularly the invention relates to thermoelectric elements of the kind discussed above which are furnished with a shunting conductor providing a leakage current flow path between the N & P conductors in parallel with the working junction. The provision of such a shunting conductor significantly improves the efficiency of the element, especially if it provides for unrestricted contact between itself and the N & P conductors along most of the length of the N and P conductors.

In experiments leading to the present invention it was found that the efficiency of the element is greatly increased if the shunting conductor is at a potential such that the leakage current flows from the N material into the shunting conductor (assuming a direction of flow in accordance with the convention that current flows from a point of nominally positive to a point of nominally negative potential), and from the shunting conductor into the P conductor; that is to say if the shunting conductor is at a potential intermediate the potentials of those ends of the N and P conductors having disparate potentials.

Therefore, an object of the present invention is to ensure that the potential of the shunting conductor is as indicated above, which object may be achieved by connecting the shunting conductor to a potential divider network across the voltage supply to the thermoelectric element. Alternatively the potential of the shunting conductor may be maintained by an electrolytic cell. When the potentials of the N and P conductors are respectively above and below earth potential, the shunting conductor may be earthed.

The invention consists in a thermoelectric element comprising an N conductor and a P conductor connected together at a working junction and adapted to be connected to an external current source or an electrical load by means creating a non-working junction, at least one shunting conductor providing a leakage current flow-path between the N and P conductors in parallel with the working junction, and means to maintain said shunting conductor at a potential intermediate the potentials of those ends of the N and P conductors having disparate potentials.

It has recently been proposed to utilise a shunting conductor in the form of a film of silver or other metal bridging the N and P conductors and applied to the exposed surface of the N and P conductor. However, it is difficult to arrange for such a film to have accurate cross-sectional dimensions (on which its thermal and electric conductance depend), and for maximum efficiency of any particular thermoelectric element the conductance values of the shunting conductors are critical. Therefore preferred embodiments of the present invention are provided with wire or wirelike shunting conductors located within the N and P conductors with N and P conductors in the form of elongated bars the shunting conductor is usually accommodated in fine bore drillings or holes and extending longitudinally of (that is to say in the hot to cold direction of) the N and P conductors.

Figure 2:
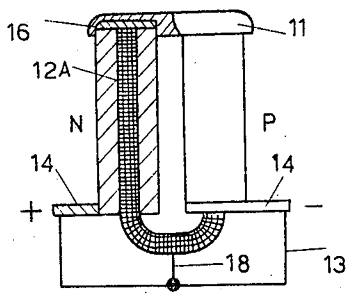
Figure 2A:
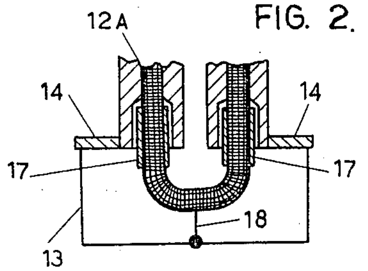
Figure 3:
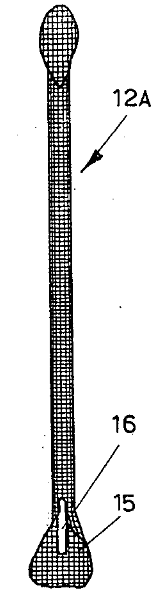
Figure 4:
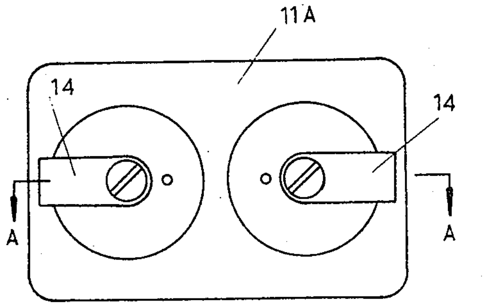
Figure 4A:
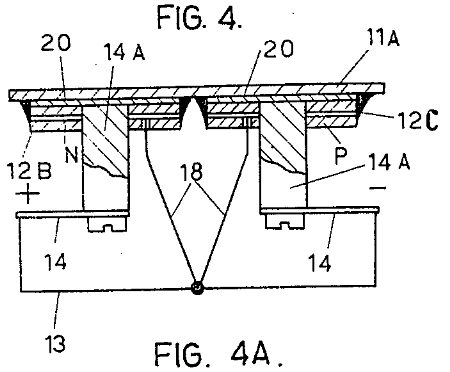
Figures 5, 5A:
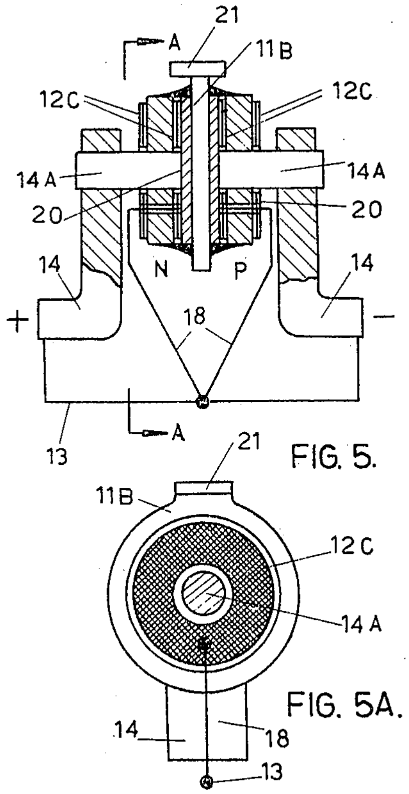
Figure 6:
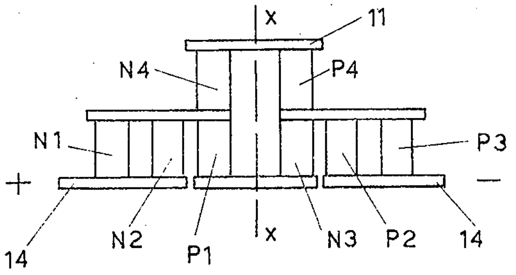
Figure 7:
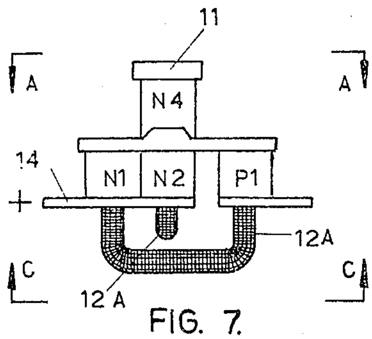
Figure 7B:
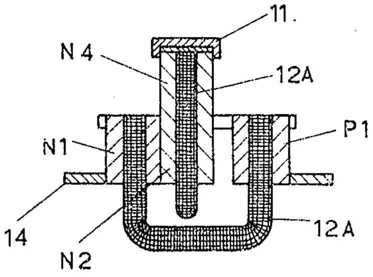
Figure 7C:
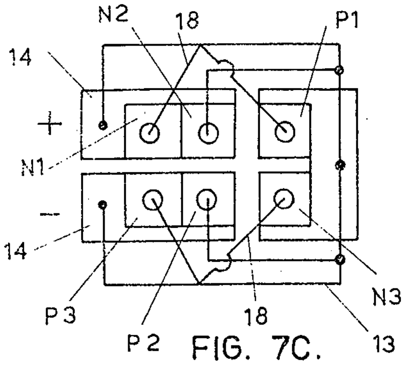
Figure 7A:
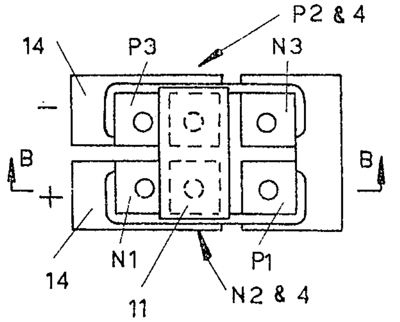

By way of example several embodiments of the invention are described below with reference to the accompanying drawings, of which:

FIG. 1 is a partly sectioned, diagrammatic front elevation of an element according to the invention, FIG. 2 is a view similar to FIG. 1 of a second embodiment of the invention, FIG. 2*a* is a sectional view of the bottom portion of a third embodiment, FIG. 3 is a perspective view of a partly formed shunting conductor, being a component of the said second and third embodiments of the invention, FIG. 4 is a view from below of a fourth embodiment of the invention, FIG. 4*a* is a sectional elevation of said fourth embodiment taken on line *a*—*a* of FIG. 4, FIG. 5 is a sectional elevation of a fifth embodiment of the invention, FIG. 5a is a sectional view of said fifth embodiment taken on line a—a of FIG. 5, FIG. 6 is a front elevation of a conventional two stage, cascade type of electrothermal element, FIG. 7 is a front elevation of a sixth embodiment of the invention being an element of the type of FIG. 6 but modified in accordance with the invention, FIG. 7a is a plan view taken on line a—a of FIG. 7, FIG. 7b is a sectional view taken on line b—b of FIG. 7a.

FIG. 7c is a view from below taken on line c—c of FIG. 7.

In all the figures the N and P semi-conductors are marked N and P respectively and likewise other identical or corresponding components bear like reference numerals in all figures.

The FIG. 1 embodiment is probably the simplest or most fundamental example of an element according to the invention. It comprises N and P conductors, disposed side by side, connected together at the cold end (as illustrated) by a preferably copper end-plate 11 constituting the working junction of the element.

The other ends of the N and P conductors are soldered or otherwise closely united with terminal plates 14 marked + and −, for connection to a D.C. source of that polarity.

In accordance with the second aspect of the invention a shunting conductor 12 extends through fine bore drillings extending through the N and P conductors in their longitudinal (that is hot to cold) direction.

The conductor 12 may for example consist of three fine wires loosely twisted together. Three strands of 0.25 mm diameter wire may be fitted into a hole of 1 mm diameter. The three strands are preferably first painted with colloidal silver before insertion. The twist allows the silver to adhere very firmly to the strands and after insertion good contact with the walls of the hole is assured.

In accordance with the first aspect of the invention the shunting conductor 12 is connected at its mid-point to the mid-point of a fine diameter wire 13 extending from one terminal plate 14 to the other and constituting a voltage divider network.

In the FIG. 2 embodiment the stranded shunting conductor 12 of FIG. 1 is replaced by a conductor 12A comprising a very fine wire mesh 15 (approximately 200 meshes per inch is suitable) of copper or bronze wrapped around a flexible insulating core 16 without overlap. A suitable core is for example the plastic outer insulation of hookup wire. The wire mesh 15 which forms a thin metallic cylinder is preferably painted with colloidal silver and drawn into the holes in the N and P conductors of, for example, 2.5 mm diameter before the silver has had time to dry. The silver fills the apertures of the mesh and the adhesion to the walls of the hole is so firm that, after the silver suspension has dried, it is nearly impossible to pull the conductor and the plastic core out again.

The superiority of the shunting conductors 12 and 12A compared to a surface film is mainly due to the fact that the cross-section of both the twisted wires and the wire mesh may be measured before assembly with a high degree of accuracy for example by means of a micrometer. This measurement is very important because it is possible to calculate the optimum cross section of the conductor expressed as a fraction of the cross section of the N or P conductor. For example with average values of the electrical and heat conductivity of metal and bismuth telluride the ratio of metal to bismuth telluride is approximately 3/1000 which can easily be satisfied in practice. This measurement is very much more difficult to perform with a surface film.

In general it may be said that the shunting conductor 12 is more suitable for thin N or P conductors and the shunting conductor 12A for heavier N and P conductors.

At the cold end of each N or P conductor the shunting conductor 12 or 12A is preferably cut flush with the end face of the N or P conductor. Care must be taken to ensure that it does not contact the copper endplate 11. It is preferred for the central region of the face to be insulated from the endplate by a paper washer 16. On the other hand the shunting conductor should make contact with the wall of the hole along substantially its entire length. However, under some circumstances it may be advantageous to inhibit contact between metal and bismuth-telluride along a short stretch near the hot end of the bar. This may be achieved by widening the hole to accommodate an insulating sleeve 17 as shown in FIG. 2a.

In the FIG. 1 embodiment the shunting conductor 12 may be connected directly to the voltage divider conductor 13, in general however that connection is made by one or more tapping conductors 18 as shown in other figures.

Preferably the voltage divider conductor 13 comprise one or two strands of thin copper wire. Its current consumption is negligible. Moreover it can be immersed in the hot reservoir. Generally the mid-point of the shunting conductor is connected to the mid-point of the voltage divider conductor but this is not always so in that the connection may be made at points not exactly coinciding with the midpoints, but in the neighbourhood of the mid-points to make up for differences in the conductivities of the arms. In the following it is assumed for simplicity that the connection is exactly at the mid-points of the respective conductors.

It is appropriate to explain at this point the action the metallic shunting conductors are called upon to perform in order to improve the performance of the thermoelectric element as a whole.

The cross section of the metallic shunting conductors is calculated in such a way that the heat conduction and the heat production (Joule heat) for the compound conductor-metal + bismuth telluride − are a minimum, that is, their product is smaller than the same quantities for the parts. This saving is in the first instance independent of the thermoelectric properties of the arms. However, in conjunction with the Peltier effect the saving in Joule heat allows a larger temperature difference to develop across the thermo-junction as compared to the temperature difference produced by a conventional junction.

However, the mere presence of the shunting conductor would not be sufficient to maximise the performance of the element if it were not for the fact that the currents in the metallic shunting conductors flow in a direction opposite to the currents in the bismuth telluride or other semi-conductor constituting the bulk of the element arms; and, such a flow pattern is achieved by the voltage divider network.

To describe the action of an element according to the invention in a different way: it must be kept in mind that, taking as an example the N-arm of the element, all current streamlines leaving the semi-conductor and entering the metal are associated with negative Peltier heat — that is "cold" — at the boundary. The same applies to the P-arm remembering that here the current carriers are positive entities (holes). This mechanism would not act as described (except perhaps fortuitously with crystalline materials) if the metallic shunting conductors were electrically floating, that is, not connected to a voltage divider.

The action described is in no way dependent on the shape of the shunting conductors (wire, foil, wire mesh, etc). Moreover the conductors may be moulded into the N & P conductors in the process of compressing and sintering. Also, surface films may be used if desired but they are thought to be somewhat less convenient than conductors in the interior of the N and P conductors.

An important feature is that the metallic shunting conductors constitute very nearly an equipotential surface and that the distribution of current is continuous along this surface. This is in accordance with a well-known thermo-dynamic principle according to which the coordinates of a heat engine must vary in infinitesimal steps, that is, not in abrupt or discrete steps if a close approach to an ideal engine — a Carnot engine — is the aim.

It will be understood that one endplate 11 may serve as a common cold junction for a plurality of pairs of N and P conductors including their metal shunting conductors and share the currents of all pairs.

It is not asserted that silver (or copper) and bismuth telluride are the only substances suitable for constructing elements in accordance with the invention. There may be other substances, perhaps not even discovered yet, which may give even higher performance if used in accordance with the principles of this invention.

It is by no means necessary that the thermoelectric elements have the conventional form exemplified by FIGS. (1) and (2) which is characterized by the use of round or prismatic bars of thermoelectric materials. The bars may for example be replaced by round discs in which the current flows either radially outwards from the centre to the periphery or radially inwards from the periphery to the centre. Such a configuration with current flowing radially outwardly is shown in FIGS. (4) and (5) for two different arrangements of copper endplate.

In the FIG. 4 embodiment N and P annuli 12B are soldered at their outer peripheries to a junction or "end" plate 11A and at their inner peripheries to terminal posts 14A. The inner ends of the posts 14A and the inner surface of the annuli are insulated from the plate 11A by insulating discs 20.

Each annulus 12B comprises two discs of N or P material as the case may be with a shunting conductor 12C in the form of a wire mesh washer sandwiched between them.

The outer discs are drilled to permit tapping conductors 18 to extend from the shunting conductors 12B to voltage divider 13.

The FIG. 5 embodiment is similar but the N and P annuli are on opposite sides of the junction plate 11B. In this arrangement the resistance due to the plate 11B is extremely small but it is in general necessary to make provision for an extension 21 of the endplate in its own plane to make use of the cooling effect.

The shunting conductors 12C are foil or mesh annuli applied to the faces of the N & P annuli. Otherwise the components of the FIG. 5 embodiment correspond to those of the FIG. 4 embodiment and (being correspondingly referenced) need no further description.

The invention may be applied to cascade type elements.

This is illustrated in FIGS. 7, 7*a*, 7*b* and 7*c*. A basic conventional two stage, finite cascade is shown in FIG. 6.

If the N and P rods have similar resistances, so that the potential drops across all sub-elements is the same, a very compact arrangement may be achieved by "folding" the cascade of FIG. 6 about line $x - x$, and eliminating the unnecessary spacing between like N and P conductors of the same potential. Such a configuration is shown in FIGS. 7, 7*a*, 7*b* and 7*c*.

The position of the shunting conductors, tapping conductors and voltage divider conductors is shown clearly in those figures, and needs no further description.

It is mentioned however that a characteristic feature very favourable for efficient operation is the position of the metallic shunting conductors in the two long N and P bars. As shown in the drawing the shunting conductors pass through from the first to the second stage of the cascade without a break. The connection of the voltage dividers is indicated clearly in the bottom view FIG. 7*c*.

The means described in the previous paragraphs for the improvement of Peltier couples may also be adapted to the improvement of thermoelectric junctions for the generation of power.

I claim:

1. A thermoelectric element comprising an N conductor and a P conductor connected together at a working junction and adapted to be connected to an external current source or an electrical load by means creating a non-working junction, at least one shunting conductor providing a leakage current flow-path between the N and P conductors in parallel with the working junction, and means to maintain said shunting conductor at a potential intermediate the potentials of those ends of the N and P conductors having disparate potentials.

2. A thermoelectric element according to claim 1 wherein said means to maintain the shunting conduction at a potential intermediate the potentials of those ends of the N and P conductors having disparate potentials is a potential divider.

3. A thermoelectric element according to claim 1 wherein said shunting conductor contacts said N and P conductors along a major portion of the largest dimension of said N and P conductors.

4. A thermoelectric element according to claim 1 wherein said working junction comprises an endplate connecting said N and P conductors.

5. A thermoelectric element according to claim 1 wherein the shunting conductor comprises a silver coating.

6. A thermoelectric element as claimed in claim 1 wherein the dimensions of said shunting conductor is such that heat conduction and Joule heat production by said thermoelectric element are minimal.

7. A thermoelectric element according to claim 1 wherein said shunting conductor is located partly within the N conductor and partly within said P conductor.

8. A thermoelectric element according to claim 7 wherein, said N and P conductors are elongated bars each with a longitudinal hole which accommodates part of said hunting conductor.

9. A thermoelectric element according to claim 8 wherein said shunting conductor comprises a plurality of wires twisted together.

10. A thermoelectric element according to claim 8 wherein said shunting conductor comprises a tubular wire mesh sleeved on a flexible insulating core.

11. A thermoelectric element according to claim 8 wherein said shunting conductor is insulated from direct contact with end portions of said N and P conductors adjacent the ends thereof furthest from said working junction.

12. A thermoelectric element according to claim 1 wherein said N and P conductors are circular or annular discs in which current flows radially.

13. A thermoelectric element according to claim 12 wherein said N and P conductors each comprises two layers sandwiching a washer of the shunting conductor.

14. A thermoelectric element according to claim 12 wherein said shunting conductor comprises two pairs of washers, each pair sandwiching one of said N and P conductors.

15. A thermoelectric element according to claim 13 wherein said washers are circular or annular wire meshes connected by tapping wires.

16. A thermoelectric element according to claim 12 wherein the centres of said N and P conductors are connected to terminal means and the outer peripheries of the N and P conductors are in electrical connection to form said working junction.

17. A thermoelectric element according to claim 1 and being of cascade type.

* * * * *